UNITED STATES PATENT OFFICE.

WILLIAM G. BARBEE, OF HIGH POINT, NORTH CAROLINA.

IMPROVEMENT IN PRESERVING FRUITS AND VEGETABLES FOR FOOD.

Specification forming part of Letters Patent No. 144,592, dated November 18, 1873; application filed September 20, 1873.

*To all whom it may concern:*

Be it known that I, WILLIAM G. BARBEE, of High Point, Guilford county, North Carolina, have invented certain Improvements relating to Preserved Food, of which the following is a specification:

The invention relates to preservation by drying. I have experimented successfully with several kinds of fruits and vegetables, and believe that it may be applied with advantage in preserving berries, and also in preserving animal food, as meats, fowls, and fish.

I dry the material in a natural condition; then soak it in a solution of sugar, and dry again.

The treatment of green corn should be a little different. I extract the milk and pulp of the grain, add a certain amount of sugar directly, then dry it, and pack for winter or summer use. Being freed from all the bran or tough skin of the corn, it has all the valuable properties of green corn with no objectionable qualities.

The following is a description of what I consider the best means of carrying out the invention as applied to the treatment of peaches: I take the peaches in a firm condition, not too soft or ripe, and peel and slice carefully, sift on as much sugar as will stick to the fruit, and spread thin on an Alden evaporating-sieve, pass it into the evaporator, and treat it in the ordinary manner therein until dry—say, from three to six hours. The sugar should be of grade A, B, or extra C. Removing the fruit from the evaporator, I have ready a kettle of warm sirup, made from the same grade of sugar, and boiled down to a nearly-saturated condition. In this warm sirup I immerse the dried fruit, and allow it to remain from four to six hours, or until the fruit, by absorbing the solution, expands nearly or fully to its original size. I then remove it from the sirup, and again treat it in the evaporator until dry. This second operation will, ordinarily, require from three to five hours. After being the second time dried, I keep it in a dark and moderately-damp cellar for about twenty-four hours, until it becomes a little limber, and then pack in barrels or boxes for use or shipment.

The consistency of the sugar sirup may vary with different articles of food. Experience or the demands of the market will decide what is best in particular cases. In peaches thus treated about twenty-five per cent. of their solid matter should be sugar. Damsons and cherries should be from forty to sixty per cent. sugar.

Green corn is a vegetable which appears admirably adapted for this mode of treatment. In applying the process to several of the choicest fruits I have found the good qualities generally improved. I believe that, up to the proper point, the presence of the sugar is in nowise objectionable, while it tends to avoid the deterioration in quality due to ordinary drying.

The details may be modified within wide limits. Peaches and many other fruits may be preserved without slicing, or they may be sliced to varied thicknesses.

I prepare for market the pulp of green corn by separating the pulp from the skin or bran; then add sugar according to the kind of corn. Some is fully sweet without sugar; but most corn requires sugar before it is dried.

I claim as my invention—

1. The treatment of fruit and other food by drying and partial saturation with sugar, substantially as and for the purposes herein specified.

2. The treatment of green corn by separating the milk and pulp from the hulls and drying, as herein specified.

In testimony whereof I have hereunto set my hand this 13th day of September, 1873, in the presence of two subscribing witnesses.

W. G. BARBEE.

Witnesses:
R. I. LINDSAY,
E. S. BROWN.